(12) United States Patent
Yoshinari

(10) Patent No.: US 9,404,061 B2
(45) Date of Patent: Aug. 2, 2016

(54) GREASE COMPOSITION

(71) Applicant: KYODO YUSHI CO., LTD., Fujisawa-shi, Kanagawa (JP)

(72) Inventor: Terasu Yoshinari, Chigasaki (JP)

(73) Assignee: KYODO YUSHI CO., LTD., Kanagawa (JP)

( * ) Notice: Subject to any disclaimer, the term of this patent is extended or adjusted under 35 U.S.C. 154(b) by 0 days.

(21) Appl. No.: 14/430,743

(22) PCT Filed: Jun. 5, 2014

(86) PCT No.: PCT/JP2014/064968
§ 371 (c)(1),
(2) Date: Mar. 24, 2015

(87) PCT Pub. No.: WO2014/196599
PCT Pub. Date: Dec. 11, 2014

(65) Prior Publication Data
US 2015/0252282 A1    Sep. 10, 2015

(30) Foreign Application Priority Data

Jun. 5, 2013  (JP) .................. 2013-119078

(51) Int. Cl.
*C10M 115/08* (2006.01)
*C10M 105/18* (2006.01)
(Continued)

(52) U.S. Cl.
CPC ............ *C10M 169/02* (2013.01); *B60K 31/185* (2013.01); *F16C 33/6633* (2013.01);
(Continued)

(58) Field of Classification Search
CPC .................. C10M 2215/102; C10M 2207/04; C07C 41/16
USPC ................... 508/552, 581; 568/635
See application file for complete search history.

(56) References Cited

U.S. PATENT DOCUMENTS 5,462,684 A * 10/1995 Naka ............... C10M 169/02
                                              508/485
6,407,292 B1   6/2002  Wu et al.
(Continued)

FOREIGN PATENT DOCUMENTS

CN    101622333 A    1/2010
CN    102333851 A    1/2012
(Continued)

OTHER PUBLICATIONS

Extended Search Report issued by the European Patent Office in corresponding European Application No. 14808022.9 on Jul. 29, 2015 (6 pages).
(Continued)

*Primary Examiner* — Vishal Vasisth
(74) *Attorney, Agent, or Firm* — Buchanan, Ingersoll & Rooney PC

(57) ABSTRACT

Provided is a grease composition containing a urea thickener represented by formula (1):

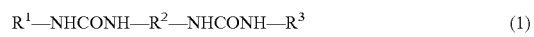

$R^1$—NHCONH—$R^2$—NHCONH—$R^3$    (1)

(wherein $R^2$ is a bivalent aromatic hydrocarbon group having 6 to 15 carbon atoms; and $R^1$ and $R^3$, which may be the same or different from each other, represent an alkyl group having 8 to 22 carbon atoms, cyclohexyl group or an aryl group having 6 to 12 carbon atoms); and a base oil containing at least one compound represented by formula (3):

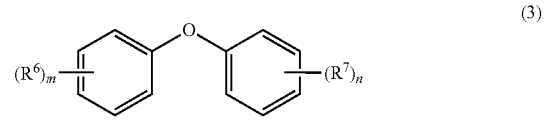

(3)

(wherein $R^6$ and $R^7$, which may be the same or different from each other, represent a branched alkyl group having 10 to 26 carbon atoms, with the ratio of the number of moles of the alkyl groups represented by $R^6$ and $R^7$ being defined; and m and n are real numbers of 0 or more so as to satisfy the condition of $1.0 \leq m+n \leq 3.0$).

19 Claims, 7 Drawing Sheets

(51) Int. Cl.
  *C07C 43/02* (2006.01)
  *C07C 43/20* (2006.01)
  *C10M 169/02* (2006.01)
  *B60K 31/18* (2006.01)
  *F16C 33/66* (2006.01)
  *C10M 159/12* (2006.01)

(52) U.S. Cl.
  CPC ........... *C10M105/18* (2013.01); *C10M 115/08* (2013.01); *C10M 159/12* (2013.01); *C10M 2205/223* (2013.01); *C10M 2207/026* (2013.01); *C10M 2207/0406* (2013.01); *C10M 2207/289* (2013.01); *C10M 2215/064* (2013.01); *C10M 2215/1026* (2013.01); *C10M 2217/0456* (2013.01); *C10N 2230/06* (2013.01); *C10N 2230/08* (2013.01); *C10N 2230/10* (2013.01); *C10N 2240/02* (2013.01); *C10N 2250/10* (2013.01); *F16C 2326/01* (2013.01)

(56) References Cited

U.S. PATENT DOCUMENTS

| | | |
|---|---|---|
| 2010/0093567 A1 | 4/2010 | Endo et al. |
| 2011/0306429 A1 | 12/2011 | Mikami et al. |
| 2014/0080744 A1 | 3/2014 | Fujinami et al. |

FOREIGN PATENT DOCUMENTS

| | | |
|---|---|---|
| JP | S50-76065 | 4/1975 |
| JP | S50-73064 | 6/1975 |
| JP | S55-73791 A | 6/1980 |
| JP | 2007-39628 A | 2/2007 |
| WO | WO 00/39061 A1 | 7/2000 |
| WO | WO 2005/040081 A1 | 5/2005 |
| WO | 2012-102051 A | 5/2012 |
| WO | WO 2012-091019 A1 | 7/2012 |
| WO | WO 2014/069669 A1 | 5/2014 |
| WO | WO 2014/069670 A1 | 5/2014 |

OTHER PUBLICATIONS

International Search Report (PCT/ISA/210) mailed on Sep. 9, 2014, by the Japanese Patent Office as the International Searching Authority for International Application No. PCT/JP2014/064968.

Written Opinion (PCT/ISA/237) mailed on Sep. 9, 2014, by the Japanese Patent Office as the International Searching Authority for International Application No. PCT/JP2014/064968.

Kohno, "Practical applications and effects of phenyl ether synthetic lubricating oils", Journal of economic maintenance tribology, vol. 417, pp. 18-23, Dec. 5, 2000, Lubrication Technology Inc.

Office Action and Search Report issued by the Chinese Patent Office in corresponding Chinese Patent Application No. 201480002820.2 on Oct. 20, 2015 (5 pages).

* cited by examiner

GREASE COMPOSITION

TECHNICAL FIELD

The present invention relates to a grease composition suitably used for rolling bearings, especially those of the automotive electrical equipment or automotive auxiliaries.

BACKGROUND ART

To satisfy the demands on cars for a smaller size and lighter weight on one hand and a larger living space on the other hand, the reduction of space for the engine room has been required, which leads to the reduction in size and weight of the automotive electrical equipment and the automotive auxiliaries in the engine room, such as alternators, tension pulleys and the like. Also, in response to the demand for quietness, the engine room is closely sealed, so that the temperature in the operating environment will be high. In light of the above, the grease suitable for the rolling bearings, especially for the rolling bearings of the automotive electrical equipment or automotive auxiliaries is required to be resistant to high temperatures and have a long lubrication life.

For the rolling bearings of the automotive electrical equipment or automotive auxiliaries, alkyldiphenyl ethers (ADE) are conventionally used as base oil of the grease. A variety of ADE compounds with excellent heat resistance are proposed (JP Sho 50-73064 A, JP Sho 50-73065 A, JP Sho 55-73791 A, JP 2007-39628 A, WO 2005/040081 A, WO 00/39061 A, and Masatsugu Kohno, "Practical applications and effects of phenyl ether synthetic lubricating oils" Journal of economic maintenance tribology, vol. 417, pp. 18-23, Dec. 5, 2000, Lubrication Technology Inc.

As mentioned above, however, further improvement in heat resistance and lubrication life of the grease composition used for the automotive electrical equipment or automotive auxiliaries is required in line with the recent tendency to reduce the size and weight of those mechanical members and seal them tightly. The conventional ADEs cannot meet those requirements.

SUMMARY OF INVENTION

Technical Problem

An object of the invention is to provide a grease composition which is excellent in the heat resistance and the lubrication life.

Solution to Problem

After the inventors of the invention have intensively studied to achieve the above-mentioned object, it was found that a grease composition excellent in the heat resistance and the lubrication life can be obtained by using a particular alkyldiphenyl ether alone or in combination. The invention has been thus accomplished based on the findings.

Namely, the invention provides a grease composition as shown below.

1. A grease composition comprising a thickener and a base oil, wherein the thickener is a urea compound represented by the following formula (1):

$$R^1-NHCONH-R^2-NHCONH-R^3 \quad (1)$$

wherein $R^2$ is a bivalent aromatic hydrocarbon group having 6 to 15 carbon atoms; and $R^1$ and $R^3$, which may be the same or different from each other, represent an alkyl group having 8 to 22 carbon atoms, cyclohexyl group or an aryl group having 6 to 12 carbon atoms; and the base oil comprises at least one compound represented by the following formula (3):

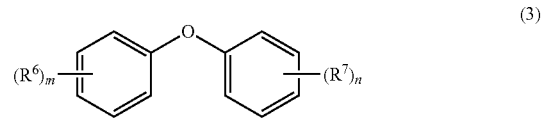

(3)

wherein $R^6$ and $R^7$, which may be the same or different from each other, represent a branched alkyl group having 10 to 26 carbon atoms, with the ratio of the number of moles of the alkyl groups represented by $R^6$ and $R^7$ where the carbon atom attached to the phenyl ring is a quaternary carbon atom being 40 to 95 mol % with respect to the total number of moles of the above-mentioned branched alkyl groups; and m and n are real numbers of 0 or more so as to satisfy the condition of $1.0 \leq m+n \leq 3.0$.

2. The grease composition described in the above-mentioned item 1, wherein the thickener is the urea compound of formula (1) where $R^2$ is a bivalent aromatic hydrocarbon group having 6 to 15 carbon atoms, and $R^1$ and $R^3$, which may be the same or different from each other, represent an alkyl group having 8 to 22 carbon atoms or cyclohexyl group.

3. The grease composition described in the above-mentioned item 1, wherein the thickener is the urea compound of formula (1) where $R^2$ is a bivalent aromatic hydrocarbon group having 6 to 15 carbon atoms, and $R^1$ and $R^3$, which may be the same or different from each other, represent cyclohexyl group or an aryl group having 6 to 12 carbon atoms.

4. The grease composition described in any one of the above-mentioned items 1 to 3, characterized in that the base oil comprises the compound represented by formula (3) which is obtainable by an addition reaction of a diphenyl ether with a branched α-olefin represented by formula (2):

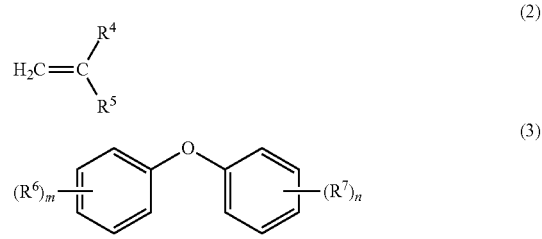

wherein $R^4$ and $R^5$, which may be the same or different from each other, represent an alkyl group having 4 to 12 carbon atoms, and $R^6$, $R^7$, m and n are the same as those defined in the item 1.

5. The grease composition described in any one of the above-mentioned items 1 to 3, characterized in that the base oil comprises the compound represented by formula (3) which is obtainable by an addition reaction of a diphenyl ether derivative represented by formula (4) with the branched α-olefin represented by formula (2):

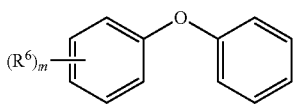

(4)

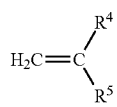

(2)

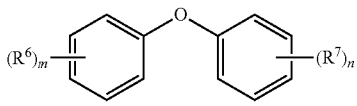

(3)

wherein $R^4$ and $R^5$ are the same as those defined in the above item 4, and $R^6$, $R^7$, m and n are the same as those defined in the item 1.

6. The grease composition described in any one of the above-mentioned items 1 to 5, wherein the compound represented by formula (3) is contained in an amount of 20 to 95 mass % based on the total mass of the grease composition.

7. The grease composition described in any one of the above-mentioned items 1 to 6, which is used for rolling bearings.

Effects of Invention

The invention can provide a grease composition excellent in the heat resistance and the lubrication life. The grease composition of the invention also exhibits improved resistance to oxidation.

DESCRIPTION OF EMBODIMENTS

[Thickener]

Figure 1:
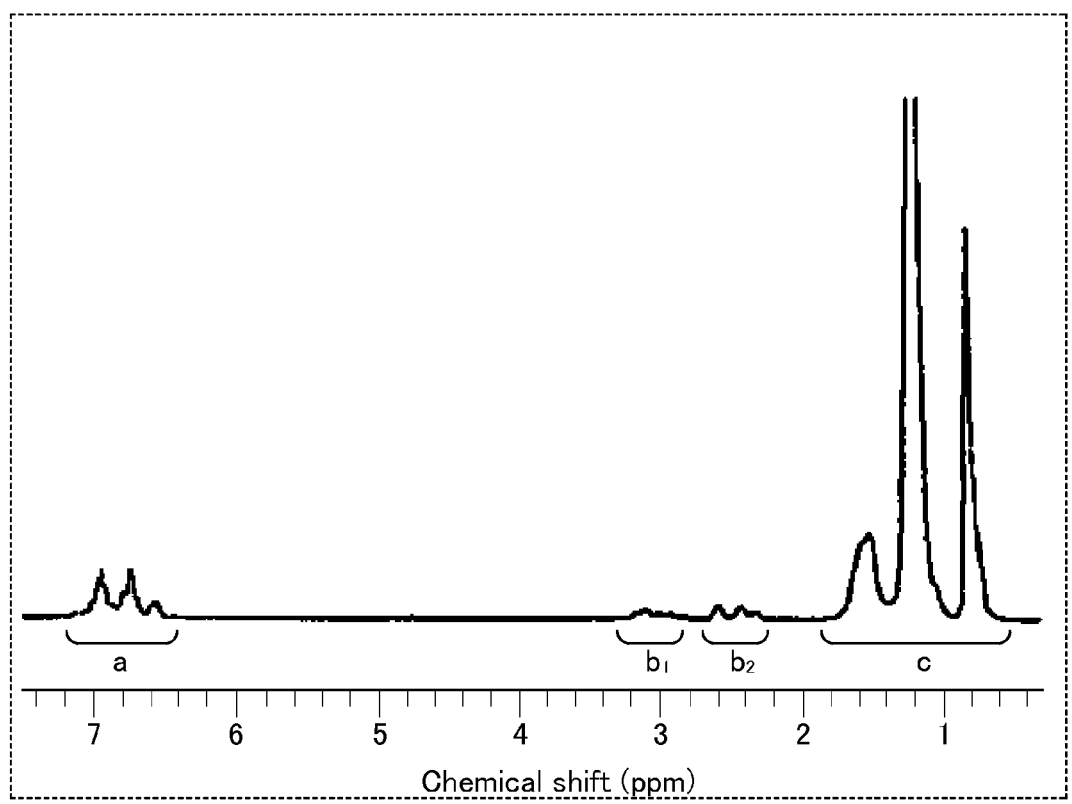
FIG. 1 is $^1$H-NMR spectrum of a model compound.

The fluidity of grease in the bearing under the circumstances of high temperature varies depending on the kind of thickener contained in the grease, which largely has an effect on the bearing lubrication life. In order to allow the grease to extend the lubrication life, the grease is required to constantly stay at the part to be lubricated without softening or leaking. The thickener used in the invention is a diurea compound represented by the following formula (1):

$$R^1\text{—NHCONH—}R^2\text{—NHCONH—}R^3 \quad (1)$$

wherein $R^2$ is a bivalent aromatic hydrocarbon group having 6 to 15 carbon atoms; and $R^1$ and $R^3$, which may be the same or different from each other, represent an alkyl group having 8 to 22 carbon atoms, cyclohexyl group or an aryl group having 6 to 12 carbon atoms.

Representative examples of the group represented by $R^2$ include those of the following structural formulas. Of the groups shown below, the group where two phenylene groups are bonded to methylene group, which is in the middle of the row is most preferable.

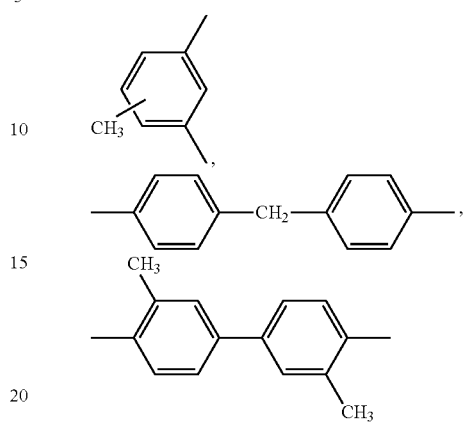

$R^1$ and $R^3$ are each an alkyl group having 8 to 22 carbon atoms, preferably a straight-chain alkyl group having 8 to 18 carbon atoms. The straight-chain alkyl group having eight carbon atoms or 18 carbon atoms is most preferable. Of the aromatic hydrocarbon groups having 6 to 12 carbon atoms, the aromatic hydrocarbon group having seven carbon atoms is preferable, and p-tolyl group is more preferable.

When one of $R^1$ or $R^3$ is an alkyl group having 8 to 22 carbon atoms, and the other is cyclohexyl group, the ratio of the number of moles of cyclohexyl group to the total number of moles of $R^1$ and $R^3$ may preferably be 60 to 95%, more preferably 70 to 90%.

It is preferable that $R^1$ and $R^3$ be a straight-chain alkyl group having eight carbon atoms, a straight-chain alkyl group having 18 carbon atoms, cyclohexyl group or p-tolyl group.

In particular, it is preferable that both of $R^1$ and $R^3$ represent a straight-chain alkyl group having eight carbon atoms; or $R^1$ and $R^3$ be the same or different and represent a straight-chain alkyl group having 18 carbon atoms or cyclohexyl group; or both of $R^1$ and $R^3$ represent p-tolyl group.

When $R^1$ and $R^3$, which is the same or different, represent a straight-chain alkyl group having 18 carbon atoms or cyclohexyl group, the ratio of the number of moles of cyclohexyl group to the total number of moles of the alkyl group having 18 carbon atoms and the cyclohexyl group may preferably be 60 to 95%, more preferably 70 to 90%.

The most preferable diurea compounds include a diurea compound synthesized from diphenylmethane diisocyanate and octylamine, a diurea compound synthesized from diphenylmethane diisocyanate and a mixture of cyclohexylamine and stearylamine (molar ratio of cyclohexylamine to stearylamine: 5:1), and a diurea compound synthesized from diphenylmethane diisocyanate and p-toluidine.

The thickener may preferably be contained in an amount of 5 to 25 mass %, more preferably 10 to 20 mass %, based on the total mass of the grease composition according to the invention. When the content of the thickener is less than 5 mass %, the soft grease will cause the leakage, so that the satisfactory lubrication life may not be obtained. On the other hand, when the content of thickener exceeds 25 mass %, the poor fluidity will make it difficult for the grease to penetrate into a part to be lubricated, which cannot achieve the sufficient lubrication life.

[Base Oil]

The base oil used in the invention comprises at least one compound represented by the above-mentioned formula (3).

In the formula (3), m and n are real numbers of 0 or more so as to satisfy the condition of $1.0 \leq m+n \leq 3.0$, and may preferably be real numbers between 2.0 and 3.0. When $m+n<1.0$, the evaporation loss of base oil will be too large. When $m+n>3.0$, the viscosity and the pour point of the resultant base oil unfavorably becomes too high. The base oil used in the invention may comprise a monoalkylated diphenyl ether of formula (3) where $m+n=1.0$, which may be contained in an amount of about 0.1 mol %, but preferably 20 mol % or less, based on the total number of moles of the compounds represented by formula (3).

$R^6$ and $R^7$, which may be the same or different from each other, represent a branched alkyl group having 10 to 26 carbon atoms, with the ratio of the number of moles of the alkyl groups represented by $R^6$ and $R^7$ where the carbon atom attached to the phenyl ring is a quaternary carbon atom (hereinafter also referred to as "ratio of quaternary carbon" simply) being 40 to 95 mol %, preferably 45 to 90 mol %, more preferably 50 to 80 mol %, and still more preferably 50 to 65 mol %, with respect to the total number of moles of the above-mentioned branched alkyl groups. When the ratio of quaternary carbon is less than 40%, the heat resistance and the lubrication life under high temperatures may not be sufficient. The heat resistance and the lubrication life under high temperatures will not be poor when the ratio of quaternary carbon exceeds 95%, but 95% is the limit of the current technology.

The number of carbon atoms of $R^6$ and $R^7$ may preferably be from 16 to 20. When the number of carbon atoms is less than 10, evaporation loss of the base oil will disadvantageously be too large. When the number of carbon atoms exceeds 26, the viscosity and the pour point of the resultant base oil will become extremely high.

$R^6$ and $R^7$ may be bonded to the phenyl ring at any position. Examples of $R^6$ and $R^7$ include 1-butyl-1-methylheptyl group, 1-methyl-1-pentyloctyl group, 1-hexyl-1-methylnonyl group, 1-heptyl-1-methyldecyl group, 1-methyl-1-octylundecyl group, and 1-decyl-1-methyltridecyl group. Of the above groups, 1-methyl-1-octylundecyl group is preferred.

As the compound represented by formula (3), a reaction product of diphenyl ether with 2-octyldodecene is particularly preferred.

The compound represented by formula (3) can be obtained by addition reaction between diphenyl ether and a branched α-olefin represented by formula (2):

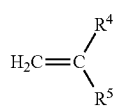

(2)

wherein $R^4$ and $R^5$ may be the same or different from each other and each represent a straight-chain or branched alkyl group having 4 to 12 carbon atoms.

Also, the compound represented by formula (3) can be obtained by addition reaction between a diphenyl ether derivative represented by formula (4) and a branched α-olefin represented by formula (2):

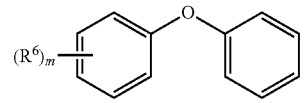

(4)

wherein $R^4$, $R^5$, $R^6$ and $R^7$, m and n are the same as those as previously defined.

For example, the compound of formula (3) used in the invention can be obtained by a Friedel-Crafts reaction between diphenyl ether or the diphenyl ether derivative (4) and a branched α-olefin or alkyl chloride in the presence of aluminum chloride as a catalyst. It is possible to obtain an alkylated diphenyl ether predominantly comprising adducts of dialkyl or higher by distilling off the unreacted materials and low-boiling fractions such as monoalkylated diphenyl ether where one alkyl group is added, and the like.

It is possible to determine the total number of added alkyl groups and the number of branched alkyl groups where the carbon atom attached to the phenyl ring is a quaternary carbon atom by following the calculations indicated below, based on the $^1$H-NMR spectrum of a model compound as shown in FIG. 1.

In FIG. 1, the chemical shifts a (6.5 to 7.3) indicate the peaks of hydrogen atoms of the phenyl ring.

The chemical shifts $b_1$ (2.8 to 3.3) and $b_2$ (2.2 to 2.7) indicate the peaks of hydrogen atoms bonded to the carbon atoms attached to the phenyl ring.

The chemical shifts c (0.5 to 1.9) indicate the peaks of hydrogen atoms of the alkyl groups.

Based on the ratios of peak areas a, $b_1$, $b_2$ and c obtained by integration, calculations are carried out in accordance with the following equations:

The total number of added alkyl groups $(m+n)=10(b_1+b_2+c)/[$(average number of hydrogen atoms in alkyl group)$a+b_1+b_2+c]$ The number of added quaternary alkyl groups $(X)= (m+n)-[(b_1+b_2)/2] \times (10-(m+n))]$ The base oil used in the invention may further comprise in addition to the above compound represented by formula (3) other base oil compounds typically used for the base oil of grease.

Examples of other usable base oil components include ester-based synthetic oils such as diesters and polyol esters, synthetic hydrocarbon oils such as poly α-olefin, silicone synthetic oils, and fluorine-containing synthetic oils. In particular, the ester-based synthetic oils and synthetic hydrocarbon oils are preferable. Of the ester-based synthetic oils, preferably used are complex ester oils that are synthesized from a polyol (e.g., pentaerythritol), a monovalent fatty acid (e.g., a straight-chain or branched saturated or unsaturated fatty acid having 6 to 22 carbon atoms, such as caprylic acid, nonanoic acid or the like) and a polybasic acid (e.g., a straight-chain or branched saturated or unsaturated dibasic fatty acid having 3 to 10 carbon atoms, such as adipic acid or the like). Especially, complex ester oils synthesized from adipic acid, heptoic acid, caprylic acid, capric acid and pentaerythritol are preferably used.

When the base oil used in the invention comprises other base oil components in addition to the compound represented by formula (3), the content of the compound represented by formula (3) may be preferably in the range of 10 to 80 mass %, and more preferably 20 to 60 mass %, based on the total mass of the base oil. In this case, the lubrication life can be extended and the torque at low temperatures can be improved.

The compound represented by formula (3) may be preferably contained in an amount of 20 to 95 mass %, and more preferably 40 to 90 mass %, based on the total mass of the grease composition according to the invention. This can lead to excellent lubrication life.

The kinematic viscosity of the base oil at 40° C. is not particularly limited, but preferably in the range of 30 to 300 mm$^2$/s, more preferably 50 to 200 mm$^2$/s. When the kinematic viscosity of the base oil at 40° C. exceeds 300 mm$^2$/s, the low-temperature fluidity will become unsatisfactory. When the kinematic viscosity of the base oil at 40° C. is less than 30 mm$^2$/s, evaporation will impair the heat resistance.

[Additives]

The grease composition of the invention may further comprise additives generally used in a variety of lubricating oil and grease compositions. Examples of such additives include an antioxidant, a rust preventive, a load carrying additive, a metallic corrosion inhibitor such as benzotriazole or the like, an oiliness improver such as fatty acids and fatty acid esters, and a solid lubricant such as molybdenum disulfide or the like. In particular, the antioxidant, the rust preventive and the load carrying additive may preferably be contained.

Those optional additives may generally be contained in an amount of 0.2 to 5 mass % based on the total mass of the grease composition according to the invention.

The antioxidant includes amine-based antioxidants and phenol-based antioxidants.

Examples of the amine-based antioxidants include N-n-butyl-p-aminophenol, 4,4'-tetramethyl-di-aminodiphenyl-methane, α-naphthylamine, N-phenyl-α-naphthylamine, phenothiazine, alkyldiphenylamine and the like. In particular, alkyldiphenylamine is preferably used.

Examples of the phenol-based antioxidants include 2,6-di-t-butyl-p-cresol (BHT), 2,2'-methylenebis(4-methyl-6-t-butylphenol), 4,4'-butylidenebis(3-methyl-6-t-butyl-phenol), 2,6-di-t-butyl-phenol, 2,4-dimethyl-6-t-butylphenol, t-butyl-hydroxyanisole (BHA), 4,4'-butylidenebis(3-methyl-6-t-butylphenol), 4,4'-methylenebis(2,3-di-t-butyl-phenol), 4,4'-thiobis(3-methyl-6-t-butylphenol), octadecyl-3-(3,5-di-t-butyl-4-hydroxyphenyl)propionate and the like. In particular, octadecyl-3-(3,5-di-t-butyl-4-hydroxyphenyl)propionate is preferably used.

The combination of the amine-based antioxidant and the phenol-based antioxidant is preferred. In particular, alkyl-diphenylamine may preferably be used in combination with octadecyl-3-(3,5-di-t-butyl-4-hydroxyphenyl)propionate.

The antioxidants may be contained in an amount of 0.5 to 6 mass % with respect to the total mass of the grease composition of the invention.

The rust preventive includes inorganic and organic rust preventives. Examples of the inorganic rust preventive include inorganic metallic salts such as sodium silicate, lithium carbonate, potassium carbonate, zinc oxide and the like. In particular, zinc oxide is preferable. Examples of the organic rust preventive include organic sulfonates such as zinc sulfonate, calcium sulfonate and the like; benzoates such as sodium benzoate, lithium benzoate and the like; carboxylates such as sodium sebacate and the like; succinic acid and derivatives thereof such as succinic anhydride, succinic acid half-ester and the like; sorbitan esters such as sorbitan monooleate, sorbitan trioleate and the like; fatty acid amine salts prepared from saturated or unsaturated fatty acids having 4 to 22 carbon atoms, preferably 8 to 18 carbon atoms and the saturated or unsaturated amines having 1 to 42 carbon atoms, preferably 4 to 22 carbon atoms, and the like. In particular, it is preferable to use succinic acid derivatives, organic sulfonates and fatty acid amine salts are preferable, and more preferable to use a succinic acid half-ester, a zinc sulfonate (particularly, zinc dinonylnaphthalenesulfonate), and a mixture comprising an amine salt prepared from a fatty acid having eight carbon atoms and an amine having 12 carbon atoms and an amine salt prepared from a fatty acid having 18 carbon atoms and mixed amines having 12 to 20 carbon atoms.

The inorganic and organic rust preventives may preferably be used in combination. It is preferable to use zinc oxide together with a succinic acid half-ester, zinc dinonylnaphthalenesulfonate, and a mixture comprising an amine salt prepared from a fatty acid having eight carbon atoms and an amine having 12 carbon atoms and an amine salt prepared from a fatty acid having 18 carbon atoms and mixed amines having 12 to 20 carbon atoms.

The content of the rust preventives may preferably be in the range of 0.2 to 10 mass % based on the total mass of the grease composition of the invention.

Examples of the load carrying additive include zinc dialkyldithiocarbamate (ZnDTC) and zinc dialkyldithiophosphate (ZnDTP). In particular, zinc dialkyldithiophosphate (ZnDTP) is preferred.

Preferably, the load carrying additive may be contained in an amount of 0.2 to 5 mass % based on the total mass of the grease composition of the invention.

[Worked Penetration]

The worked penetration of the grease composition according to the invention may preferably be 200 to 310. When the worked penetration exceeds 310, leakage of grease will frequently occur at high-speed rotation, which may not lead to the satisfactory lubrication life. On the other hand, when the worked penetration is less than 200, the satisfactory lubrication life may not be obtained due to the poor fluidity.

[Bearings]

Suitable bearings where the grease composition of the invention is enclosed are those for automotive electrical equipment or automotive auxiliaries, such as the alternator, electromagnetic clutch for the automobile air conditioner, intermediate pulley, idler pulley, tension pulley and the like.

In particular, it is preferable that the composition of the invention consist essentially of a thickener, a base oil and additives, where the thickener consists of the compound represented by formula (1) and the base oil consists of the compound represented by formula (3).

Furthermore, it is particularly preferable that the composition of the invention consist essentially of a thickener, a base oil and additives, where the thickener consists of a urea compound represented by formula (1) where $R^2$ is a bivalent aromatic hydrocarbon group having 6 to 15 carbon atoms, and $R^1$ and $R^3$, which may be the same or different from each other, represent an alkyl group having 8 to 22 carbon atoms or cyclohexyl group, and the base oil consists of the compound represented by the above-mentioned formula (3a).

It is more preferable that the composition of the invention consist essentially of a thickener, a base oil and additives, where the thickener consists of a urea compound represented by formula (1) where $R^2$ is a bivalent aromatic hydrocarbon group having 6 to 15 carbon atoms, and $R^1$ and $R^3$, which may be the same or different from each other, represent cyclohexyl group or an aryl group having 6 to 12 carbon atoms, and the base oil consists of the compound represented by the above-mentioned formula (3a).

EXAMPLES

Test Grease

Preparation of Test Grease

Diphenylmethane diisocyanate (1 mol) was reacted with a predetermined amine (2 mol of octylamine, stearyl amine, cyclohexylamine, or p-toluidine) in a base oil to obtain a base grease. To the base grease thus obtained, the base oil and additives were added and the resultant mixture was subjected to milling to such a degree that the worked penetration (JIS K2220) of the resultant mixture reached 300, thereby preparing a grease composition.

The formulations for test greases are shown in the following Table 1. The components used for the preparation of the test greases are shown below.

The term "mass %" in Tale 1 means the percentage by mass based on the total mass of each test grease.

<Base Oils>

ADE 1: Ether Oil Synthesized from Diphenyl Ether and 2-Octyldodecene (Synthesis Method)

Figure 2:
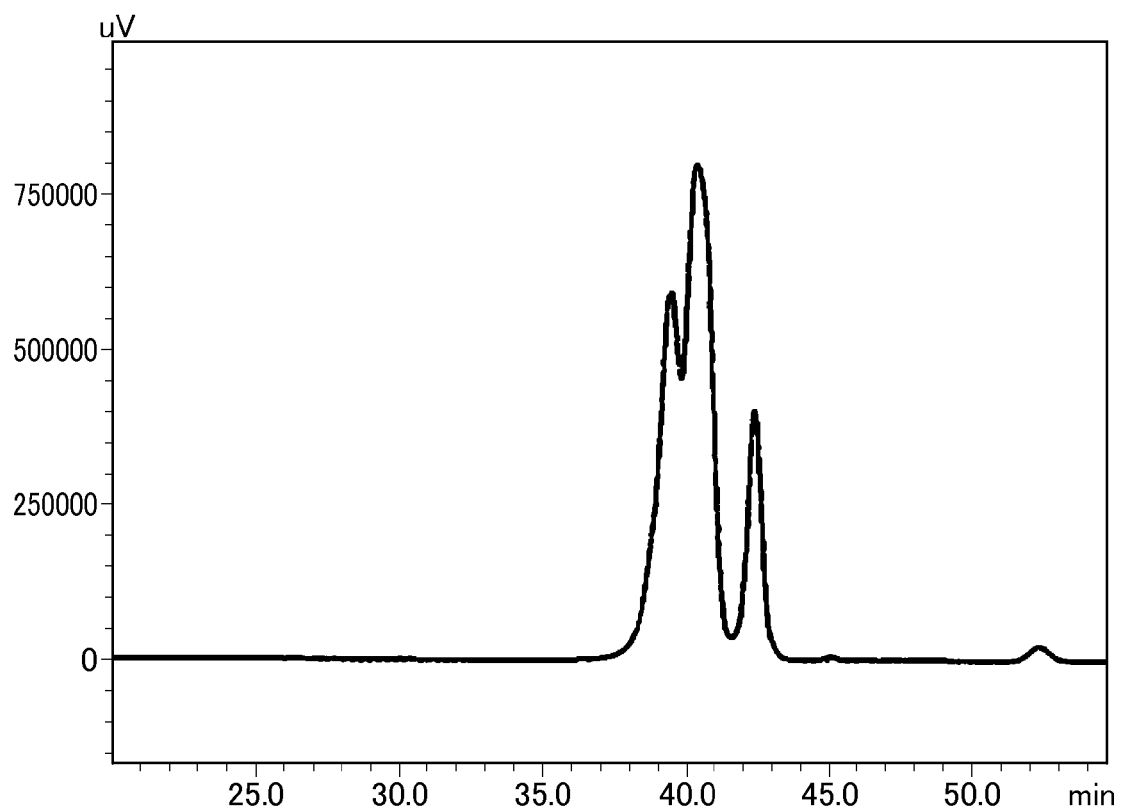
FIG. 2 is GPC spectrum of ADE1 prepared in the example.
Figure 3:
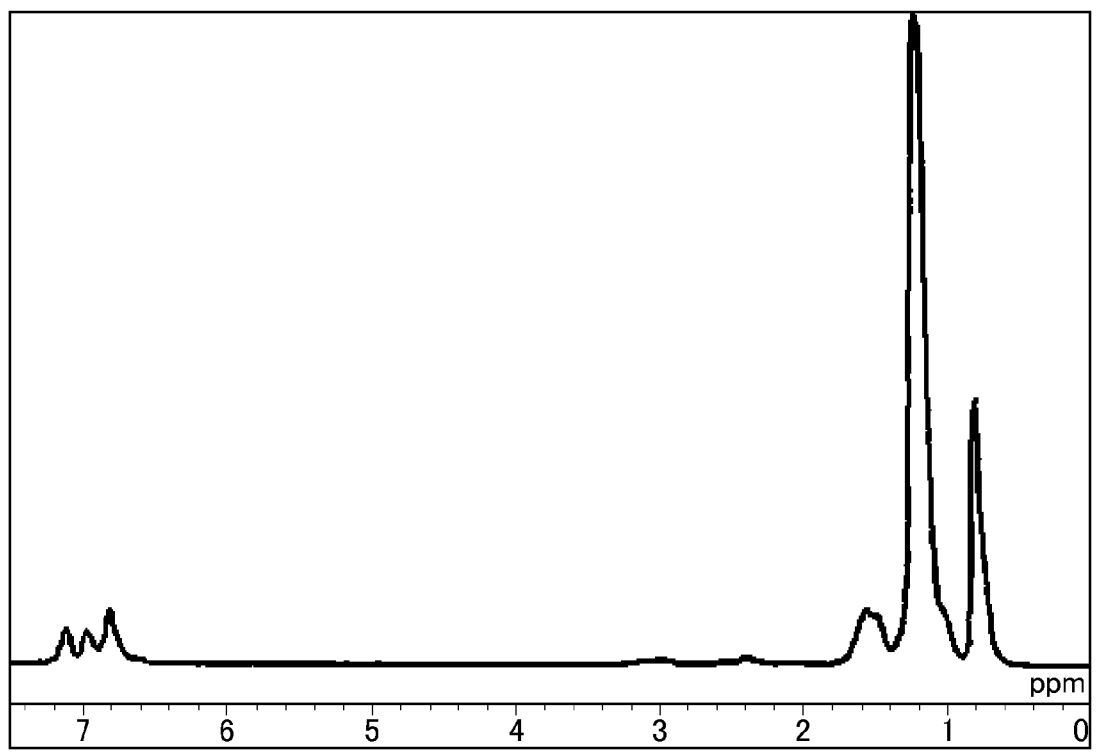
FIG. 3 is $^1$H-NMR spectrum of ADE1 prepared in the example.

After 1900 g (11.2 mol) of diphenyl ether and 33 g (0.25 mol) of anhydrous aluminum chloride were placed into a 10-L four-necked flask equipped with a stirrer, dropping funnel, thermometer and condenser, the mixture was heated to 110° C. to dissolve the anhydrous aluminum chloride. With the temperature of the reaction system being maintained at 110° C., 4700 g (16.8 mol) of 2-octyldodecene was dropwise added over a period of 4.5 hours to carry out the addition reaction. After completion of the dropwise addition, the mixture was stirred at 110° C. for 30 minutes and then allowed to stand at room temperature until the reaction mixture was cooled to 90° C. Then, with the addition of 320 g of an alkaline neutralizer, the stirring was continued for 30 minutes. Subsequently, with the addition of 160 g of activated clay, the stirring was further continued for one hour at 90° C. Then, the reaction mixture was subjected to filtration under reduced pressure to remove the aluminum chloride and other acidic matters produced as by-products. Then, the unreacted materials and monoalkyl adduct of diphenyl ether were distilled off under reduced pressure (2.5 to 3.5 torr) at temperatures between 250° C. and 324° C. Thus, 3640 g of alkylated diphenyl ether predominantly comprising dialkyl adduct was obtained. However, part of the monoalkyl adduct still remained. The GPC spectrum and $^1$H-NMR spectrum of the thus obtained compound (referred to as ADE1) are shown in FIG. 2 and FIG. 3, respectively.

(GPC)

Retention time of monoalkyl adduct: 41.704-43.643 15.9 mol %

Retention time of dialkyl adduct: 40.028-41.704 50.5 mol %

Retention time of trialkyl adduct: 37.043-40.028 33.6 mol %

($^1$H-NMR)

Suppose the value obtained from the area δ=6.5-7.3 ppm by integration to be one, the value obtained from the area δ=2.8-3.3 ppm by integration was 0.07, the value obtained from the area δ=2.2-2.7 ppm by integration was 0.09, and the value obtained from the area δ=0.5-1.9 ppm by integration was 10.93.

(Kinematic viscosity at 40° C.): 151 mm$^2$/s (The number of carbon atoms of alkyl groups, and straight-chain or branched): 20 carbon atoms, branched.

(Ratio of monoalkyl adduct): 15.9 mol %

(The total number of moles of added alkyl groups): 2.13

(Ratio of quaternary carbon): 57.5 mol %

ADE 2: Ether Oil Synthesized from Diphenyl Ether and 2-Octyldodecene (Synthesis Method)

Figure 4:
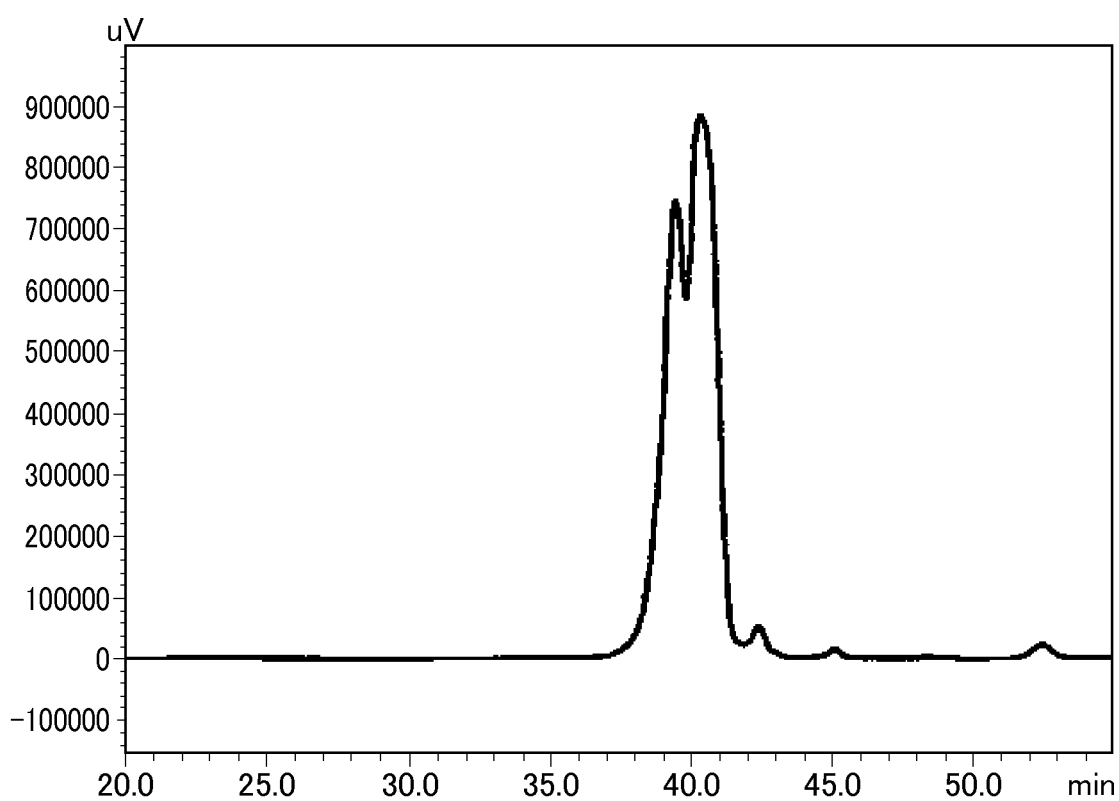
FIG. 4 is GPC spectrum of ADE2 prepared in the example.
Figure 5:
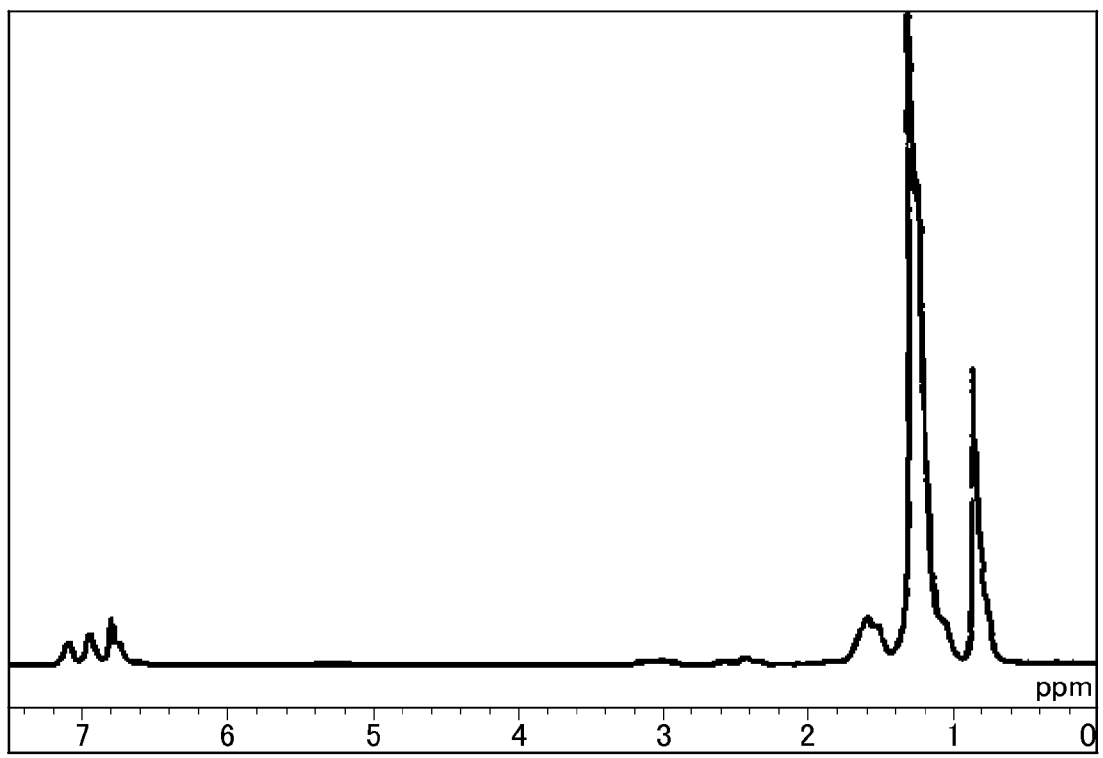
FIG. 5 is $^1$H-NMR spectrum of ADE2 prepared in the example.

After 385 g (2.3 mol) of diphenyl ether and 6.7 g (0.05 mol) of anhydrous aluminum chloride were placed into a 2-L four-necked flask equipped with a stirrer, dropping funnel, thermometer and condenser, the mixture was heated to 110° C. to dissolve the anhydrous aluminum chloride. With the temperature of the reaction system being maintained at 110° C., 950 g (3.4 mol) of 2-octyldodecene was dropwise added over a period of 4.5 hours to carry out the addition reaction. After completion of the dropwise addition, the mixture was stirred at 110° C. for 30 minutes and then allowed to stand at room temperature until the reaction mixture was cooled to 90° C. Then, with the addition of 67 g of an alkaline neutralizer, the stirring was continued for 30 minutes. Subsequently, with the addition of 35 g of activated clay, the stirring was further continued for one hour at 90° C. Then, the reaction mixture was subjected to filtration under reduced pressure to remove the aluminum chloride and other acidic matters produced as by-products. Then, the unreacted materials and monoalkyl adduct of diphenyl ether were distilled off under reduced pressure (0.1 to 0.5 torr) at temperatures between 250° C. and 324° C. Thus, 800 g of alkylated diphenyl ether predominantly comprising dialkyl adduct was obtained. The GPC spectrum and $^1$H-NMR spectrum of the thus obtained compound (referred to as ADE2) are shown in FIG. 4 and FIG. 5, respectively.

(GPC)

Retention time of monoalkyl adduct: 42.048-43.696 2.1 mol %

Retention time of dialkyl adduct: 40.126-42.048 54.9 mol %

Retention time of trialkyl adduct: 37.562-40.126 43.0 mol %

($^1$H-NMR)

Suppose the value obtained from the area δ=6.5-7.3 ppm by integration to be one, the value obtained from the area δ=2.8-3.3 ppm by integration was 0.09, the value obtained from the area δ=2.2-2.7 ppm by integration was 0.11, and the value obtained from the area δ=0.5-1.9 ppm by integration was 12.42.

(Kinematic viscosity at 40° C.): 180 mm$^2$/s (The number of carbon atoms of alkyl groups, and straight-chain or branched): 20 carbon atoms, branched.

(Ratio of monoalkyl adduct): 2.1 mol %

(The total number of moles of added alkyl groups): 2.35

(Ratio of quaternary carbon): 52.9 mol %

ADE 3: Ether Oil Synthesized from Diphenyl Ether, 1-Dodecene and 1-Tetradecene (Synthesis Method)

Figure 6:
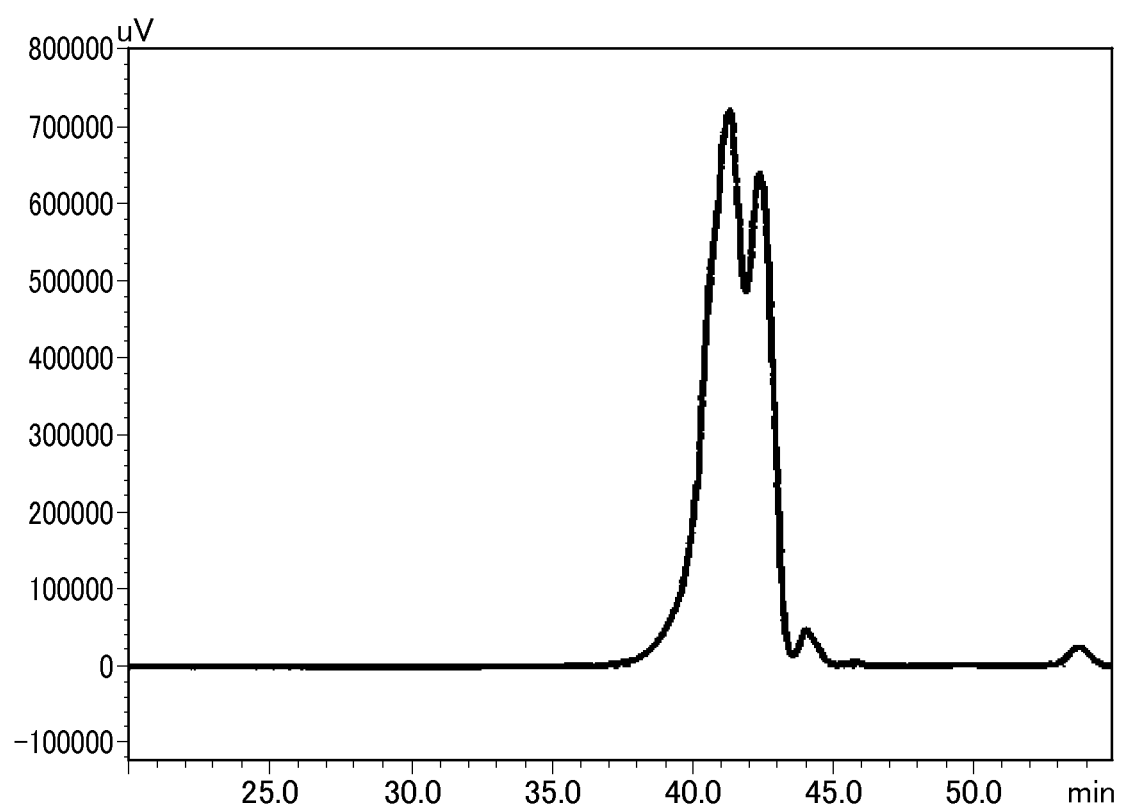
FIG. 6 is GPC spectrum of ADE3 prepared in the example.
Figure 7:
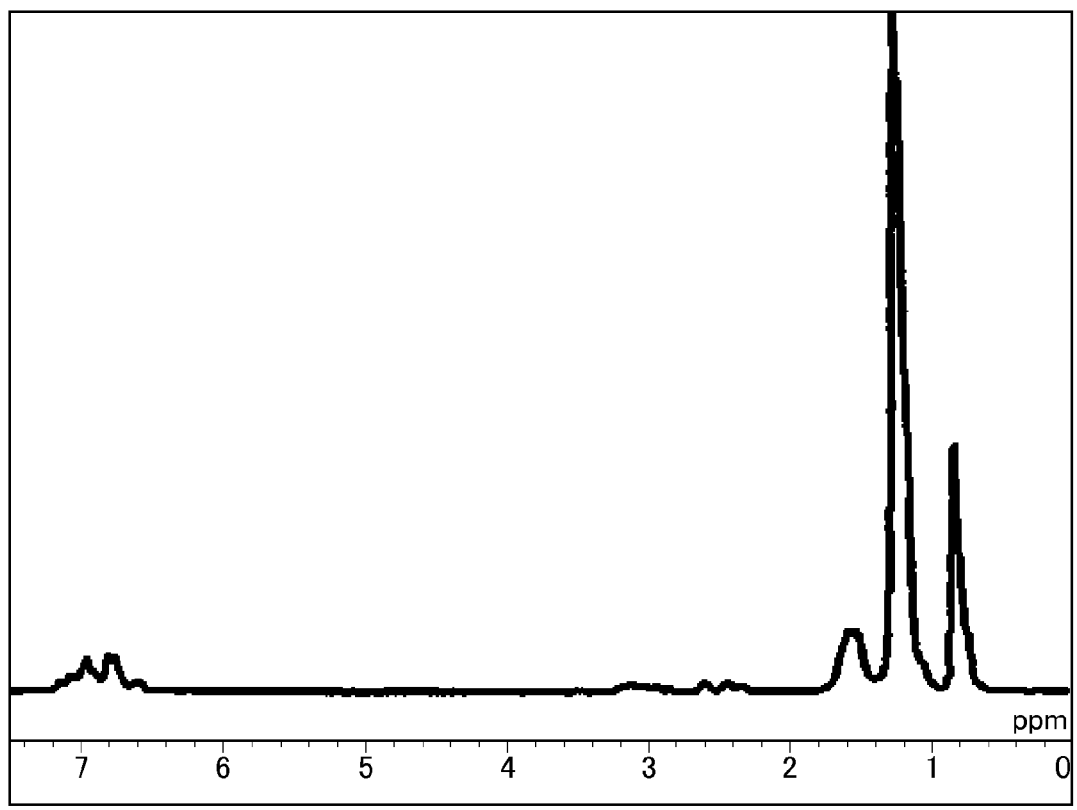
FIG. 7 is $^1$H-NMR spectrum of ADE3 prepared in the example.

After 1600 g (9.4 mol) of diphenyl ether and 15 g (0.11 mol) of anhydrous aluminum chloride were placed into a 10-L four-necked flask equipped with a stirrer, dropping funnel, thermometer and condenser, the mixture was heated to 90° C. to dissolve the anhydrous aluminum chloride. With the temperature of the reaction system being maintained at 110° C., a mixture of 1810 g (10.8 mol) of 1-dodecene and 1810 g (9.23 mol) of 1-tetradecene was dropwise added over a period of 4.5 hours in a stream of nitrogen to carry out the addition reaction. After completion of the dropwise addition, the mixture was stirred at 110° C. for 30 minutes and then allowed to stand at room temperature until the reaction mixture was cooled to 90° C. Then, with the addition of 68 g of an alkaline neutralizer, the stirring was continued for 30 minutes. Subsequently, with the addition of 68 g of activated clay, the stirring was further continued for one hour at 90° C. Then, the reaction mixture was subjected to filtration under reduced pressure to remove the aluminum chloride and other acidic matters produced as by-products. Then, the unreacted materials and monoalkyl adduct of diphenyl ether were distilled off under reduced pressure (3.0 to 4.0 torr) at temperatures between 250° C. and 324° C. Thus, 6000 g of alkylated diphenyl ether predominantly comprising dialkyl adduct was obtained. The GPC spectrum and $^1$H-NMR spectrum of the thus obtained compound (referred to as ADE3) are shown in FIG. 6 and FIG. 7, respectively.

(GPC)

Retention time of monoalkyl adduct: 43.766-45.224 1.8 mol %

Retention time of dialkyl adduct: 42.157-43.766 34.2 mol %

Retention time of trialkyl adduct: 37.328-42.157 64.0 mol %

($^1$H-NMR)

Suppose the value obtained from the area $\delta=6.5$-$7.3$ ppm by integration to be one, the value obtained from the area $\delta=2.8$-$3.3$ ppm by integration was 0.16, the value obtained from the area $\delta=2.2$-$2.7$ ppm by integration was 0.17, and the value obtained from the area $\delta=0.5$-$1.9$ ppm by integration was 10.30.

(Kinematic viscosity at 40° C.): 103 mm$^2$/s (The number of carbon atoms of alkyl groups): 12 and 14

(Ratio of monoalkyl adduct): 1.8 mol %

(The total number of moles of added alkyl groups): 2.82

(Ratio of quaternary carbon): 37.6 mol %

The kinematic viscosity of base oil was determined in accordance with JIS K 2220 23.

The ratio of monoalkyl adduct was determined from the GPC spectrum. A gel permeation chromatography (GPC) system made by Shimadzu Corporation was used. The configuration of the GPC system included CBM-20A (system controller), DGU-20A$_3$ (3-way online degassing unit), LC-20AD (high-precision solvent delivery unit), SIL-20A (auto-sampler), RID-10A (differential refractive index detector), and SPD-20A (UV-VIS detector). The measurement was conducted under the conditions that three columns KF-803L were employed, with tetrahydrofuran (THF) being used as the mobile phase at a flow rate of 30 MPa. The detector SPD-20A was used.

The total number of added alkyl groups (i.e., the sum of m+n in formula (3)), and the addition number of branched alkyl groups where the carbon atom attached to the phenyl ring is a quaternary carbon atom were determined from the $_1$H-NMR spectrum. The $_1$H-NMR spectrum was obtained using a commercially available nuclear magnetic resonance spectrometer JNM-ECX 400 (made by JEOL Ltd.). The measurement was conducted at 80° C., using no solvent and no standard substance.

<Thickeners>

Aliphatic diurea: diurea compound synthesized from diphenylmethane diisocyanate and octylamine Alicyclic-aliphatic diurea: diurea compound synthesized from diphenylmethane diisocyanate, and a mixture of cyclohexylamine and stearylamine where the ratio by mole of cyclohexylamine to stearylamine was 5:1.

Aromatic diurea: diurea compound synthesized from diphenylmethane diisocyanate and p-toluidine.

<Additives>

Antioxidant A: amine-based antioxidant (alkyldiphenylamine)

Antioxidant B: phenol-based antioxidant (octadecyl-3-(3,5-di-t-butyl-4-hydroxy-phenyl)propionate)

Rust preventive A: succinic acid half-ester

Rust preventive B: zinc dinonylnaphthalenesulfonate

Rust preventive C: mixture comprising an amine salt prepared from a fatty acid having eight carbon atoms and an amine having 12 carbon atoms and an amine salt prepared from a fatty acid having 18 carbon atoms and amines having 12 to 20 carbon atoms.

Rust preventive D: zinc oxide

Load carrying additive: zinc dialkyldithiophosphate (ZnDTP).

<Test Method>

Bearing Lubrication Life Test (in Accordance with ASTM D3336)

This test is designed to evaluate the bearing lubrication life under high temperatures by rotating the inner ring of the bearing. The amount of time passing before overcurrent of the motor took place and the amount of time passing before the bearing temperature increased by +15° C. were counted while the rolling bearing was operated under the following conditions, and the shorter one was regarded as the lubrication life. The results are shown in Table 1.

Bearing: 6204 metal sealed bearing

Test temperature: 180° C.

Number of revolutions: 10,000 rpm

Test loads: axial load of 66.7 N and radial load of 66.7 N

Evaluation: o; lubrication life of 800 hours or more.

x; lubrication life of less than 800 hours.

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Thickener (mass %) | Aliphatic diurea | 11 | — | — | — | 11 | — | — |
|  | Alicyclic-aliphatic diurea | — | 15 | — | — | — | 15 | — |
|  | Aromatic diurea | — | — | 20 | 20 | — | — | 20 |
| Base Oil (mass %) | ADE1 | bal. | bal. | bal. | — | — | — | — |
|  | ADE2 | — | — | — | bal. | — | — | — |
|  | ADE3 | — | — | — | — | bal. | bal. | bal. |
| Additives (mass %) | Antioxidant A | 1.5 | 1.5 | 1.5 | 1.5 | 1.5 | 1.5 | 1.5 |
|  | Antioxidant B | 1.2 | 1.2 | 1.2 | 1.2 | 1.2 | 1.2 | 1.2 |
|  | Rust preventive A | 1.5 | 1.5 | 1.5 | 1.5 | 1.5 | 1.5 | 1.5 |
|  | Rust preventive B | 2.0 | 2.0 | 2.0 | 2.0 | 2.0 | 2.0 | 2.0 |

TABLE 1-continued

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
|  | Rust preventive C | 1.0 | 1.0 | 1.0 | 1.0 | 1.0 | 1.0 | 1.0 |
|  | Rust preventive D | 0.5 | 0.5 | 0.5 | 0.5 | 0.5 | 0.5 | 0.5 |
|  | Load carrying additive | 0.85 | 0.85 | 0.85 | 0.85 | 0.85 | 0.85 | 0.85 |
| Bearing Lubrication Life Test | Life (hour) | 810 | 1150 | 1000 | 980 | 390 | 700 | 500 |
|  | Evaluation | ○ | ○ | ○ | ○ | x | x | x |

When using the grease compositions of Examples 1 to 4 where the base oil is ADE 1 or ADE 2 in which the ratio of the quaternary carbon is larger, the bearing lubrication life is as long as 800 hours or more in any case, which indicates excellent seizure life.

When using the grease compositions of Comparative Examples 1 to 3 where the base oil is ADE 3 in which the ratio of the quaternary carbon is smaller, the bearing lubrication life is as short as 800 hours or less in any case, which indicates poor seizure life.

The invention claimed is:

1. A grease composition comprising a thickener and a base oil, wherein;

the thickener is a urea compound represented by formula (1):

R$^1$—NHCONH—R$^2$—NHCONH—R$^3$     (1)

wherein R$^2$ is a bivalent aromatic hydrocarbon group having 6 to 15 carbon atoms; and R$^1$ and R$^3$, which may be the same or different from each other, represent an alkyl group having 8 to 22 carbon atoms, cyclohexyl group or an aryl group having 6 to 12 carbon atoms; and the base oil comprises at least one compound represented by formula (3):

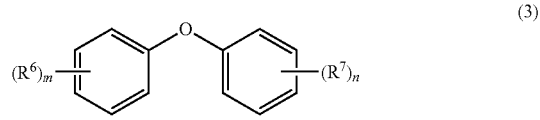     (3)

wherein R$^6$ and R$^7$, which may be the same or different from each other, represent a branched alkyl group having 10 to 26 carbon atoms, with the ratio of the number of moles of the alkyl groups represented by R$^6$ and R$^7$ where the carbon atom attached to the phenyl ring is a quaternary carbon atom being 40 to 95 mol % with respect to the total number of moles of the branched alkyl groups; and m and n are real numbers of 0 or more so as to satisfy the condition of 1.0≤m+n≤3.0.

2. The grease composition of claim 1, wherein the thickener is the urea compound of formula (1) where R$^2$ is a bivalent aromatic hydrocarbon group having 6 to 15 carbon atoms, and R$^1$ and R$^3$, which may be the same or different from each other, represent an alkyl group having 8 to 22 carbon atoms or cyclohexyl group.

3. The grease composition of claim 1, wherein the thickener is the urea compound of formula (1) where R$^2$ is a bivalent aromatic hydrocarbon group having 6 to 15 carbon atoms, and R$^1$ and R$^3$, which may be the same or different from each other, represent cyclohexyl group or an aryl group having 6 to 12 carbon atoms.

4. The grease composition of claim 3, wherein the base oil comprises the compound represented by formula (3) which is obtained by addition reaction of a diphenyl ether with a branched α-olefin represented by formula (2):

     (2)

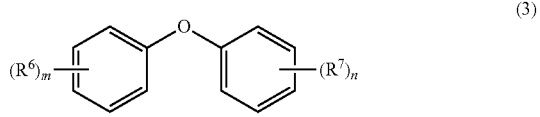     (3)

wherein R$^4$ and R$^5$, which may be the same or different from each other, represent an alkyl group having 4 to 12 carbon atoms, R$^6$ and R$^7$, which may be the same or different from each other, represent a branched alkyl group having 10 to 26 carbon atoms, with the ratio of the number of moles of the alkyl groups represented by R$^6$ and R$^7$ where the carbon atom attached to the phenyl ring is a quaternary carbon atom being 40 to 95 mol % with respect to the total number of moles of the branched alkyl groups; and m and n are real numbers of 0 or more so as to satisfy the condition of 1.0≤m+n≤3.0.

5. The grease composition of claim 3, wherein the base oil comprises the compound represented by formula (3) which is obtained by addition reaction of a diphenyl ether derivative represented by formula (4) with a branched α-olefin represented by formula (2):

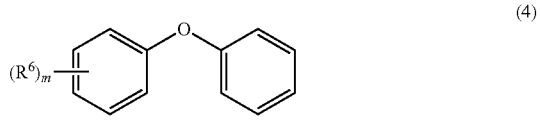     (4)

     (2)

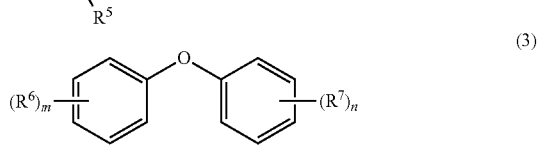     (3)

wherein R$^4$ and R$^5$, which may be the same or different from each other, represent an alkyl group having 4 to 12 carbon atoms, R$^6$ and R$^7$, which may be the same or different from each other, represent a branched alkyl group having 10 to 26 carbon atoms, with the ratio of the number of moles of the alkyl groups represented by R$^6$ and R$^7$ where the carbon atom attached to the phenyl ring is a quaternary carbon atom being 40 to 95 mol % with respect to the total number of moles of the branched alkyl groups; and m and n are real numbers of 0 or more so as to satisfy the condition of 1.0≤m+n≤3.0.

6. The grease composition of claim 5, wherein the compound represented by formula (3) is contained in an amount of 20 to 95 mass % based on the total mass of the grease composition.

7. The grease composition of claim 1, which is used for rolling bearings.

8. The grease composition of claim 2, wherein the base oil comprises the compound represented by formula (3) which is obtained by addition reaction of a diphenyl ether with a branched α-olefin represented by formula (2):

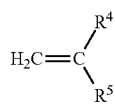

(2)

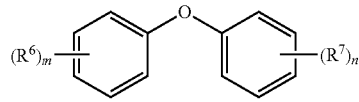

(3)

wherein $R^4$ and $R^5$, which may be the same or different from each other, represent an alkyl group having 4 to 12 carbon atoms, and $R^6$ and $R^7$, which may be the same or different from each other, represent a branched alkyl group having 10 to 26 carbon atoms, with the ratio of the number of moles of the alkyl groups represented by $R^6$ and $R^7$ where the carbon atom attached to the phenyl ring is a quaternary carbon atom being 40 to 95 mol % with respect to the total number of moles of the branched alkyl groups; and m and n are real numbers of 0 or more so as to satisfy the condition of 1.0≤m+n≤3.0.

9. The grease composition of claim 1, wherein the base oil comprises the compound represented by formula (3) which is obtained by addition reaction of a diphenyl ether with a branched α-olefin represented by formula (2):

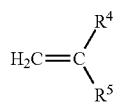

(2)

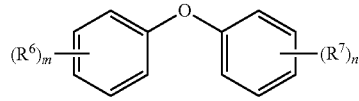

(3)

wherein $R^4$ and $R^5$, which may be the same or different from each other, represent an alkyl group having 4 to 12 carbon atoms, and $R^6$ and $R^7$, which may be the same or different from each other, represent a branched alkyl group having 10 to 26 carbon atoms, with the ratio of the number of moles of the alkyl groups represented by $R^6$ and $R^7$ where the carbon atom attached to the phenyl ring is a quaternary carbon atom being 40 to 95 mol % with respect to the total number of moles of the branched alkyl groups; and m and n are real numbers of 0 or more so as to satisfy the condition of 1.0≤m+n≤3.0.

10. The grease composition of claim 2, wherein the base oil comprises the compound represented by formula (3) which is obtained by addition reaction of a diphenyl ether derivative represented by formula (4) with a branched α-olefin represented by formula (2):

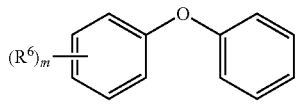

(4)

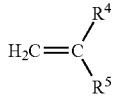

(2)

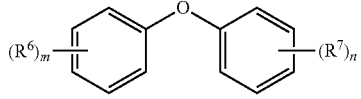

(3)

wherein $R^4$ and $R^5$ which may be the same or different from each other, represent an alkyl group having 4 to 12 carbon atoms, $R^6$ and $R^7$, which may be the same or different from each other, represent a branched alkyl group having 10 to 26 carbon atoms, with the ratio of the number of moles of the alkyl groups represented by $R^6$ and $R^7$ where the carbon atom attached to the phenyl ring is a quaternary carbon atom being 40 to 95 mol % with respect to the total number of moles of the branched alkyl groups; and m and n are real numbers of 0 or more so as to satisfy the condition of 1.0≤m+n≤3.0.

11. The grease composition of claim 1, wherein the base oil comprises the compound represented by formula (3) which is obtained by addition reaction of a diphenyl ether derivative represented by formula (4) with a branched α-olefin represented by formula (2):

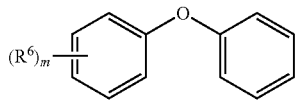

(4)

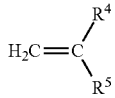

(2)

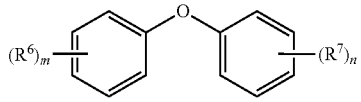

(3)

wherein $R^4$ and $R^5$ which may be the same or different from each other, represent an alkyl group having 4 to 12 carbon atoms, $R^6$ and $R^7$, which may be the same or different from each other, represent a branched alkyl group having 10 to 26 carbon atoms, with the ratio of the number of moles of the alkyl groups represented by $R^6$ and $R^7$ where the carbon atom attached to the phenyl ring is a quaternary carbon atom being 40 to 95 mol % with respect to the total number of moles of the branched alkyl groups; and m and n are real numbers of 0 or more so as to satisfy the condition of 1.0≤m+n≤3.0.

12. The grease composition of claim 11, wherein the compound represented by formula (3) is contained in an amount of 20 to 95 mass % based on the total mass of the grease composition.

13. The grease composition of claim 10, wherein the compound represented by formula (3) is contained in an amount of 20 to 95 mass % based on the total mass of the grease composition.

14. The grease composition of claim 9, wherein the compound represented by formula (3) is contained in an amount of 20 to 95 mass % based on the total mass of the grease composition.

15. The grease composition of claim 8, wherein the compound represented by formula (3) is contained in an amount of 20 to 95 mass % based on the total mass of the grease composition.

16. The grease composition of claim 4, wherein the compound represented by formula (3) is contained in an amount of 20 to 95 mass % based on the total mass of the grease composition.

17. The grease composition of claim 3, wherein the compound represented by formula (3) is contained in an amount of 20 to 95 mass % based on the total mass of the grease composition.

18. The grease composition of claim 2, wherein the compound represented by formula (3) is contained in an amount of 20 to 95 mass % based on the total mass of the grease composition.

19. The grease composition of claim 1, wherein the compound represented by formula (3) is contained in an amount of 20 to 95 mass % based on the total mass of the grease composition.

* * * * *